P. MUELLER & A. C. SCHUERMANN.
LEAD PIPE CONNECTION.
APPLICATION FILED DEC. 26, 1914.
1,194,766.
Patented Aug. 15, 1916.
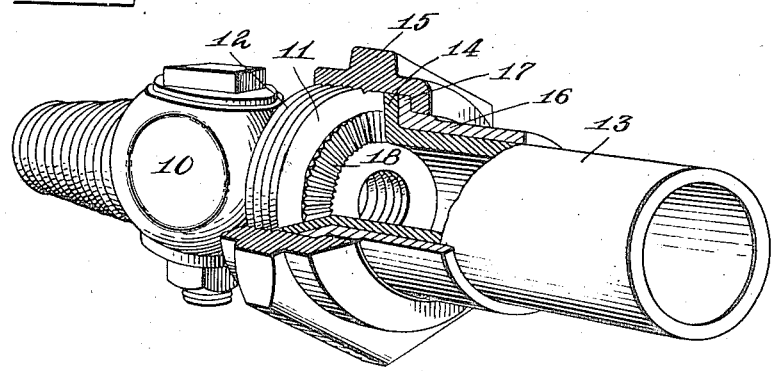
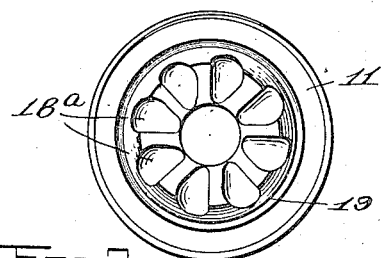
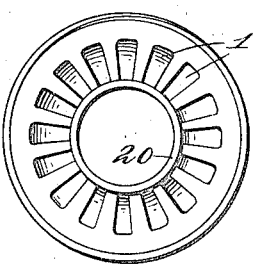
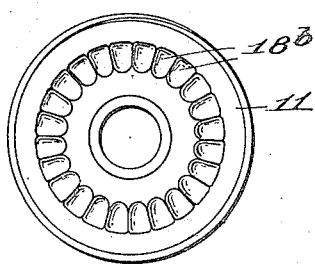
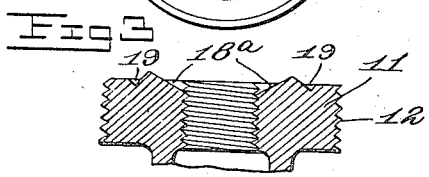
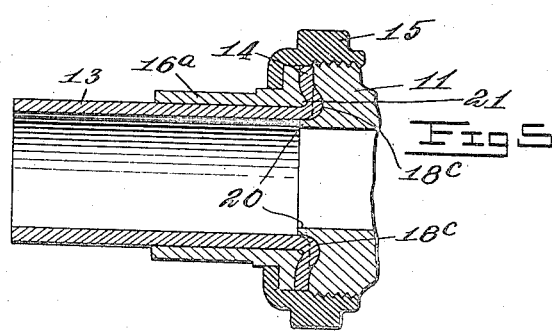
Inventors
Philip Mueller
Anton C. Schuermann
Witnesses
By
Attorney

UNITED STATES PATENT OFFICE.

PHILIP MUELLER AND ANTON C. SCHUERMANN, OF DECATUR, ILLINOIS.

LEAD-PIPE CONNECTION.

1,194,766.

Specification of Letters Patent.

Patented Aug. 15, 1916.

Application filed December 26, 1914. Serial No. 879,125.

*To all whom it may concern:*

Be it known that we, PHILIP MUELLER and ANTON C. SCHUERMANN, citizens of the United States, residing at Decatur, in the county of Macon and State of Illinois, have invented new and useful Improvements in Lead-Pipe Connections, of which the following is a specification.

This invention relates to pipe couplings of the character wherein a relatively soft or malleable member is connected to a relatively hard or unyielding member, and has particular reference to an improved coupling adapted particularly for use between a corporation cock and a lead pipe. In couplings or connections of this type, heretofore invented and used, great difficulty has been encountered in maintaining the connection water tight and preventing its working loose when the pipe, or the corporation cock, is submitted to torsional strain due to the assembling of adjacent couplings. In these prior structures when a turning force is exerted upon the lead pipe, the pipe is permitted to turn relatively to the cock, and to thus destroy the sealed connection between the flange of the lead pipe and the end of the corporation cock. It is also found that this turning of the lead pipe not only destroys the seal, but that it in nearly all cases turns the coupling collar or nut with the lead pipe, and in a few turns completely disconnects the coupling. Attempts have been made, as is clearly shown by the prior art, to overcome these difficulties or disadvantages by providing the corporation cock with a threaded extension, or with annular grooves, or the like. These devices assist in holding the lead pipe from longitudinal displacement from the corporation cock, but in no wise do they prevent the relative turning of the lead pipe with respect to the cock, and in the use of a threaded extension, positively separate the pipe from the cock upon the relative turning of the same. Moreover, a serious objection is found to couplings wherein conical extensions are provided, in that it is necessary to move the lead pipe longitudinally away from the cock to a considerable distance before the connection can be broken. In the use of corporation cocks, or fittings of this nature, it is essential to provide a coupling occupying and requiring for its disconnection but relatively small space.

It is the object of this invention to overcome all of the above noted objections and disadvantages found in prior couplings in a simple and economical coupling, and in carrying out this object of the invention the corporation cock, or relatively hard and unyielding member of the coupling, is constructed in such a manner that when the usual coupling nut is tightened upon the flange of the lead pipe, or soft and yielding member of the coupling, the flange and the pipe are not only securely held from longitudinal displacement from the corporation cock, but are also held from turning with respect to the corporation cock.

This invention may be embodied in various forms of couplings, and the objects thereof may be accomplished in various structures of the parts of couplings, but for the purpose of setting forth this invention the following is a detailed description of the present embodiment thereof, the same being illustrated in the accompanying drawings wherein,—

Figure 1 is a perspective view partly in section of a corporation cock and a lead pipe assembled by means of one form of the improved connection. Fig. 2 is a detail enlarged view of the end of the corporation cock showing a modified form of the same. Fig. 3 is a central section taken transversely through the end of the corporation cock as shown in Fig. 2. Fig. 4 is an end view of the corporation cock showing a slight modification of the construction of Fig. 2. Fig. 5 is a longitudinal section through the coupling showing a further modification of the same. Fig. 6 is a face view of the end of the corporation cock of Fig. 5.

Referring to the drawings, wherein like parts are designated by similar characters of reference throughout the several views, and particularly to Fig. 1, 10 designates a corporation cock of usual construction having the enlarged head or end 11 provided with the usual external screw threads 12. The lead pipe 13 is provided in the usual manner with an end flange 14 adapted to abut against the outer face of the head 11 of the cock, and is held in such position by the usual coupling nut 15. A sleeve 16 is placed upon the lead pipe 13 with an outturned flange 17 engaging against the outer face of the lead flange 14 to thus provide a rigid bearing surface for the coupling nut against the sleeve 16 holding the lead flange against the face of the head 11. It will be noted that the coupling nut 15 has an inturned flange, or is reduced at its outer end for engagement against the flange 17 of the sleeve 16 so as to force the collar and its flange toward the head 11 when the nut 15 is tightened. The present invention resides in making a coupling of this general character such that the lead pipe 13 can not be turned within the coupling nut 15, and against the head 11 of the corporation cock. This result may be accomplished in various ways but it is shown in Fig. 1 of the drawings as being effected by the provision of a plurality of annularly and radially arranged corrugations 18 formed on the outer face of the head 11 and against which the lead flange 14 and the flanged end 17 of the sleeve 16 is adapted to be pressed, and held in such position by the coupling nut 15.

Another way of accomplishing the result of this invention is to provide the face of the head 11 with a plurality of depressions 18$^a$ having their walls extending outwardly into which the body of the flange 14 and the end of the pipe 13 are adapted to be molded or pressed during the tightening of the coupling. As shown in Figs. 2 and 3 these depressions or recesses may be relatively large and consequently relatively few in number, or they may be made relatively small, as shown in Fig. 4 at 18$^b$, and be relatively large in number. In all cases, however, it is desired that these depressions or recesses be so formed that they present abutments or walls arranged at an angle to the circumference of the head 11 to thus prevent the turning of the pipe 13 with respect to the corporation cock. From Fig. 3 it will be noted that the depressions or recesses 18$^a$ are deeper toward the center of the head 11 and that the entire cluster of recesses 18$^a$ are surrounded by an annular groove 19 which also is relatively shallow.

The modification shown in Figs. 5 and 6 discloses the head 11 provided with a boss 20 surrounding the opening through the head, the outer surface of the boss being rounded off and merging into the outer face of the head 11 to thus provide for a curved receiving surface against which the base of the out-turned flange 14 may closely fit. This curved face of the boss 20 is provided with depressions or recesses 18$^c$ which have their inner walls conforming to the curvature of the curved abutting face whereby to receive the body portion of the lead flange 14 and pipe 13 and provide for a possibly more substantial interlocking of the pipe 13 to the head 11. It will be noted that the collar 16$^a$ as employed in this construction, shown in Fig. 5, is provided with a bead or boss 21 upon its inner end adapted to engage in the curved portion of the flange 14 and thus force said curved portion of the flange into the recesses or depressions 18$^c$ when the coupling is tightened. It will be noted from the dotted lines in Fig. 5 that the walls between the recesses or depressions 18$^c$ provide ribs or projections which are embedded in the end of the pipe 13 and its flange 14 when the coupling is assembled. It is of course understood that the projections, or corrugations used for interlocking the pipe to the corporation cock may be of any suitable form or size provided that they produce raised portions and depressions on the corporation cock, and they may also be arranged at any angle, except in the manner of screw threads as the latter have been found to only assist in separating the connection upon the accidental turning of either the corporation cock or the lead pipe.

In using the improved connection it is only necessary to assemble the parts in the ordinary manner, as when the sleeve 16 is slipped upon the end of the lead pipe 13 and the coupling nut 15 mounted on the collar, the end of the lead pipe is flanged in the usual manner and the same is moved into registry with the head 11 of the cock. The coupling nut 15 is now screwed upon the head. This nut draws the sleeve 16 against the flange 14 of the pipe and forces the pipe and its flange against the head to thus bind the lead pipe against the raised and depressed portions of the head without disturbing the flanged end embedding the extensions or raised portions of the head in the pipe 13 and its flange 14, and to mold the body of the pipe and flange into the depressions. It is thus seen that the pipe cannot be turned relatively to the cock unless sufficient force is exerted to entirely mutilate the pipe. However, if it is desired to disconnect the coupling all that is necessary to do is to unscrew the nut 15 to release the flange 14 and permit it to be moved longitudinally of the axis of the coupling through a slight distance, sufficient only to disengage the projections on the head from the then molded projections and depressions of the lead pipe.

The invention presents a relatively simple structure which may be readily and economically made as a part of the usual corporation cocks now used, and which at the same time is extremely effective in accomplishing the desired result of preventing the relative turning of the pipe and the corporation cock with no additional or different steps in the operation of assembling or disconnecting the coupling over the method now employed.

It is, of course, understood that various other structures may be resorted to than the above set forth within the spirit of this invention, the same being restricted only by the scope of the following claims.

What is claimed is,—

1. A coupling as specified comprising a head, a pipe, a sleeve for the pipe and a coupling nut securing said sleeve and said pipe to said head, said head having an interrupted flat surface for contact with said pipe whereby to prevent the turning of the same with respect to said head.

2. A coupling as specified comprising a head having a flat abutting face and having projections on said flat face arranged at an angle to the circumference of the head, a soft pipe provided with a flange abutting at one end said face, a flange sleeve for the end of the lead pipe, and a coupling nut carried by the head and engaging the said flange of the sleeve or the pipe to compress the same against the head whereby to embed said projections in the end of the pipe and retain the pipe from relative turning movement with respect to the head.

3. In a coupling as specified, a corporation cock having a head, a lead pipe provided with a flange abutting said head, a correspondingly flanged sleeve for the end of the lead pipe, a coupling nut on said head engaging said flange of the sleeve whereby to bind the same against the flange of the lead pipe and to compress the latter against said head, said head having a flat roughened surface for engagement with said pipe flange to prevent the turning of the pipe relative to said head.

4. A coupling as specified comprising a relatively hard member having a flat roughened abutting face, a relatively soft member, and a coupling device binding said members together to embed said soft member into the roughened abutting face of the hard member whereby not only to hold the members from longitudinal displacement relative to one another but to also hold the members from relative rotary displacement.

5. A coupling as specified, comprising a head provided with a flat face having thereon a series of circularly-arranged radially-disposed projections, a lead pipe provided with a flange abutting said face, and a coupling nut to compress the flange of said pipe against said face.

6. In a coupling as specified, a head provided with a flat face having a series of alternate projections and depressions circularly and radially disposed thereon, a lead pipe provided with a flange abutting said flat face, and a coupling nut to compress the flange of said pipe against said flat face.

7. A coupling as specified, comprising a head having a flat abutting face with alternate projections and depressions circularly and radially disposed thereon, said projections extending beyond the face of said head, a lead pipe provided with a flange abutting said abutting face, and a coupling nut to compress the flange of said pipe against said abutting face.

8. A coupling as specified, comprising a head having a substantially flat abutting face provided with alternate projections and depressions circularly and radially disposed thereon, a lead pipe provided with a flange abutting said head, a flanged sleeve surrounding said lead pipe and abutting said flange to compress the same against said head, a circular rib on one of said members to engage said flange, and a coupling nut to compress said head, flange and sleeve together.

9. A coupling as specified, comprising a head having a flat face with alternate projections and depressions circularly and radially disposed thereon, a lead pipe provided with a flange abutting said head, a flanged sleeve surrounding said lead pipe and having a rib thereon to compress said flange against said projections and into said depressions, and a coupling nut to compress said head, flange and sleeve together.

In testimony whereof we have hereunto set our hands in presence of two subscribing witnesses.

PHILIP MUELLER.
ANTON C. SCHUERMANN.

Witnesses:
  Mabel McIntyre,
  Charles G. Auer.